US009657194B2

(12) United States Patent
Chen et al.

(10) Patent No.: US 9,657,194 B2
(45) Date of Patent: May 23, 2017

(54) COATING COMPOSITIONS COMPRISING A BLOCKED ISOCYANATE SILANE

(71) Applicant: SDC Technologies, Inc., Irvine, CA (US)

(72) Inventors: Xiangxu Chen, Diamond Bar, CA (US); Ren-Zhi Jin, Irvine, CA (US); Masanori Iwazumi, Kawasaki (JP); Kiranmayi Deshpande, Lake Forest, CA (US)

(73) Assignee: SDC Technologies, Inc., Irvine, CA (US)

( * ) Notice: Subject to any disclaimer, the term of this patent is extended or adjusted under 35 U.S.C. 154(b) by 74 days.

(21) Appl. No.: 14/294,347

(22) Filed: Jun. 3, 2014

(65) Prior Publication Data
US 2015/0166827 A1 Jun. 18, 2015

Related U.S. Application Data

(60) Provisional application No. 61/915,578, filed on Dec. 13, 2013.

(51) Int. Cl.
*C09D 175/04* (2006.01)
*C08G 18/71* (2006.01)
*C08G 18/80* (2006.01)
*C08G 18/28* (2006.01)

(52) U.S. Cl.
CPC ......... *C09D 175/04* (2013.01); *C08G 18/286* (2013.01); *C08G 18/718* (2013.01); *C08G 18/809* (2013.01); *C08G 18/8077* (2013.01); *Y10T 428/266* (2015.01); *Y10T 428/31507* (2015.04); *Y10T 428/31663* (2015.04)

(58) Field of Classification Search
CPC C08G 18/286; C08G 18/718; C08G 18/8077; C08G 18/809; C09D 175/04; Y10T 428/266; Y10T 428/31507; Y10T 428/31551; Y10T 428/31663
USPC ............ 428/412, 423.1, 447; 528/25, 29, 44
See application file for complete search history.

(56) References Cited

U.S. PATENT DOCUMENTS

| | | | |
|---|---|---|---|
| 4,036,813 A | 7/1977 | Hardman et al. | |
| 4,201,832 A | 5/1980 | Hall et al. | |
| 4,714,657 A | 12/1987 | Quinn et al. | |
| 5,374,699 A * | 12/1994 | Iwamura | C08F 8/00 525/327.2 |
| 6,225,434 B1 | 5/2001 | Sadvary et al. | |
| 7,368,586 B2 | 5/2008 | Pfeiffer et al. | |
| 2002/0103286 A1* | 8/2002 | Speier et al. | 524/492 |
| 2006/0159923 A1* | 7/2006 | Becker-Willinger | B05D 1/185 428/403 |
| 2008/0028983 A1 | 2/2008 | Briehn et al. | |
| 2008/0262169 A1 | 10/2008 | Pfeiffer et al. | |
| 2012/0160413 A1* | 6/2012 | Laferte | C08G 18/10 156/331.7 |

FOREIGN PATENT DOCUMENTS

WO 2009099106 A1 8/2009

OTHER PUBLICATIONS

International Search Report and Written Opinion for related PCT Application No. PCT/US2014/040604, pp. 1-8, mailed Oct. 22, 2014.
International Search Report and Written Opinion, PCT/US2014/016341, dated Jun. 27, 2014.

* cited by examiner

*Primary Examiner* — Thao T Tran
(74) *Attorney, Agent, or Firm* — Calfee, Halter & Griswold LLP

(57) ABSTRACT

Disclosed herein are stable organosiloxane coating compositions comprising a blocked isocyanate silane and at least one polyol that provide abrasion resistant coatings for transparent polymer substrates. The cured coatings also have excellent adhesion to the polymer substrates. In accordance with certain embodiments, the disclosed coating compositions, which when cured on the substrate, provide formable, weatherable, anti-fog, or combinations of formable, weatherable, or anti-fog organosiloxane coatings. Also disclosed herein are articles comprising coatings cured from such coating compositions, and processes for making the coating compositions.

18 Claims, No Drawings

COATING COMPOSITIONS COMPRISING A BLOCKED ISOCYANATE SILANE

CROSS REFERENCE TO RELATED APPLICATIONS

This application claims priority to and any benefit of U.S. provisional patent application No. 61/915,578 for COATING COMPOSITIONS COMPRISING A BLOCKED ISOCYANATE SILANE, filed on Dec. 13, 2013, the entire disclosure of which is fully incorporated herein by reference.

FIELD

This disclosure relates to coating compositions comprising a blocked isocyanate silane and at least one polyol that provide abrasion resistant coatings for transparent plastic substrates.

BACKGROUND

Transparent plastic materials, i.e., high molecular weight organic polymers, have been widely used in a variety of optical and glazing applications. For example, transparent plastic materials are widely used in optical lenses, goggles, face shields, face plates for helmets, glazings used as windows in buildings, and glazings used as windshields or windows in buses, airplanes, and other transportation vehicles. However, transparent plastic materials tend to be soft and scratch or mar quite easily, which leads to reduced visibility and clarity through the transparent article.

Organosiloxane coatings have been used to help maintain visibility and clarity through the transparent plastic materials by providing a protective, abrasion resistant layer over the plastic material substrate. Protective, abrasion resistant organosiloxane coatings are typically applied to the transparent plastic material in liquid form and then are cured to form the protective coating. The polymeric components of the coating composition crosslink during the curing process to harden and form the protective, abrasion resistant coating.

Not all organosiloxane abrasion resistant coatings are compatible with the surface of the plastic material, and therefore, require a primer layer to provide the necessary adhesion for the coating to remain adhered to the plastic.

Certain transparent plastic materials, such as polycarbonate polymers, are formable. Formable materials are those in which the starting material is made pliable in some manner, and is then formed (shaped) and set into a desired, finished shape. Thermoforming is one type of forming process that may be used on formable materials. Thermoforming is a manufacturing process where a plastic sheet is heated to a pliable forming temperature, formed to a specific shape in a mold, and trimmed to create a usable product. More specifically, the sheet, or "film" when referring to thinner gauges and certain material types, is heated in an oven to a sufficiently high temperature that it can be stretched into or onto a mold and cooled to a finished shape. In many glazing and optical applications, it may be beneficial or even necessary to apply an abrasion resistant coating to the transparent plastic material prior to forming the plastic into the finished shape. However, not all such abrasion resistant coatings are compatible with the forming processes, such as thermoforming, because the coatings may crack or craze when the underlying transparent plastic substrate is subjected to changes in shape. In particular, abrasion resistance and formability in organosiloxane protective coatings generally share an inverse relationship. Abrasion resistance in the organosiloxane coating correlates to the hardness of the coating. A harder coating provides a more abrasion-resistant coating than a comparably less hard coating. However, harder organosiloxane coatings are less formable.

SUMMARY

In accordance with embodiments of the present disclosure, stable organosiloxane coating compositions comprising a blocked isocyanate silane and at least one polyol that provide abrasion resistant coatings for transparent polymer substrates are disclosed. The cured coatings also have excellent adhesion to the polymer substrates. In accordance with certain embodiments, the disclosed coating compositions, which when cured on a substrate, provide formable, weatherable, anti-fog, or combinations of formable, weatherable, or anti-fog coatings.

In accordance with one embodiment, the coating composition comprises a blocked isocyanate silane and at least one polyol. The blocked isocyanate silane is represented by the formula:

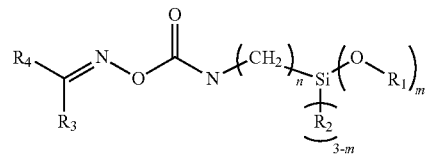

where $R_1$ is an alkyl group having from 1 to 10 carbon atoms, where $R_2$ is an alkyl group having from 1 to 20 carbon atoms, where $R_3$ is an alkyl group having from 1 to 5 carbon atoms, where $R_4$ is an alkyl group having from 1 to 5 carbon atoms, where m is an integer selected from 1, 2, or 3, and where n is an integer selected from 2 to 6.

In accordance with another embodiment, an article is disclosed. The article comprises a substrate and a coating coated on at least one surface of the substrate. The coating is prepared by thermal curing the coating composition on the substrate at a temperature of at least 100° C. for at least 60 minutes.

In accordance with another embodiment, processes for making the coating composition are disclosed. For example, a process for making the coating composition includes the steps of mixing the blocked isocyanate silane with water to form a mixture comprising hydrolysis products and partial condensates of the blocked isocyanate silane and water, and mixing the mixture with the at least one polyol to form the coating composition.

DETAILED DESCRIPTION

Unless otherwise indicated herein, the term "average molecular weight" refers to the number average molecular weight ($M_n$) of the compound.

A "blocked isocyanate" as used herein, unless otherewise indicated, refers to the reaction product of an isocyanate and a blocking group ("BL"). The reaction product is stable at room temperature, but dissociates to regenerate isocyanate functionality under heating (e.g., thermal treatment).

As used herein, a "polyol" is a monomeric or polymeric compound with multiple hydroxyl functional groups, i.e., two or more hydroxyl moieties. A polyol with two hydroxyl groups is a diol, one with three is a triol, one with four is a tetrol, and so on.

The term "stable," unless otherwise indicated herein, refers to coating compositions that are useable for an amount of time suitable for a particular application. For example, reactive two-component polyurethane systems need to be applied to a substrate, such as a transparent glass or plastic material, soon after mixing because the mixing initiates an irreversible reaction of the components of the coating composition. This irreversible reaction can render the composition unsuitable for use if the composition is not used quickly enough after the initiation of the reaction (i.e., combination of the two components). In contrast, the stable organosiloxane coating compositions disclosed herein can be stored for an extended period of time after it has been prepared, i.e., weeks or months, when stored at a temperature of about 0° C. to about 40° C., before it is applied to the substrate and curing is initiated thermally.

Coating Composition

Disclosed herein are stable organosiloxane coating compositions that provide abrasion resistant coatings for transparent polymer substrates. The cured coatings also have excellent adhesion to the polymer substrates, such that the coating compositions do not require a primer layer (i.e., the coating compositions are primer-free). In accordance with certain embodiments, the disclosed coating compositions, which when cured on a substrate, also provide formable, weatherable, anti-fog, or combinations of formable, weatherable, or anti-fog coatings.

The coating compositions comprise a blocked isocyanate silane and at least one polyol. The coating composition comprises from about 0.1% to about 60% by weight of the blocked isocyanate silane, including from about 5% to about 50% by weight, including from about 10% to about 40% by weight, based on the total weight of the solids of the coating composition.

The blocked isocyanate silane is represented by the formula:

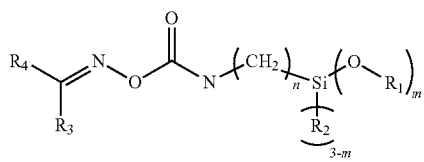

where $R_1$ is an alkyl group having from 1 to 10 carbon atoms, where $R_2$ is an alkyl group having from 1 to 20 carbon atoms, where $R_3$ is an alkyl group having from 1 to 5 carbon atoms, where $R_4$ is an alkyl group having from 1 to 5 carbon atoms, where m is an integer selected from 1, 2, or 3, and where n is an integer selected from 2 to 6.

In certain embodiments, the coating composition comprises a blocked isocyanate silane according to the formula above in which preferably m is 3, n is 3, $R_1$ is an alkyl group having 1 or 2 carbon atoms (a methyl or ethyl group, respectively), $R_3$ is an alkyl group having 1 carbon atom (a methyl group), and $R_4$ is an alkyl group having 2 carbon atoms (an ethyl group).

In accordance with the preceding and other embodiments, the blocked isocyanate silane is the reaction product of a ketoxime and an isocyanate functional silane. Non-limiting examples of preferred ketoximes that may be used to obtain the blocked isocyanate silane includes butanone oxime, acetone oxime, and the like. Non-limiting examples of suitable isocyanate functional silanes include isocyanate functional alkoxysilanes such as 3-isocyanatopropyltriethoxysilane, 3-isocyanatopropyltrimethoxysilane, and the like.

As mentioned above, the coating compositions disclosed herein include at least one polyol. The coating composition comprises from about 5% to about 90% by weight of the at least one polyol, including from about 10% to about 70% by weight, including from about 15% to about 50% by weight, based on the total weight of the solids of the coating composition. Nonlimiting examples of suitable polyol compounds for use in the coating compositions disclosed herein include monomeric polyols such as trimethylolpropane, trimethylolethane, pentaerythritol, dipentaerythritol, hexanediols such as 1,6-hexanediol, butanediols such as 1,4-butanediol, heptanediols such as 1,7-heptanediol, octanediols such as 1,8-octanediol, and the like; and polymeric polyols including but not limited to polyether polyols, such as polyethylene glycol, polypropylene glycol, and poly(tetramethylene ether) glycol; polyester polyols such as polycaprolactone polyols; polycarbonate polyols; polyestercarbonate polyols; polyurethane polyols; and combinations thereof. A polyester polyol contains ester functional groups in its main chain. A polycarbonate polyol contains carbonate functional groups in its main chain. A polyestercarbonate polyol contains both ester and carbonate functional groups in its main chain. A polyurethane polyol contains urethane functional groups in its main chain. In accordance with certain embodiments, the at least one polyol is polymeric. In accordance with this embodiment, the at least one polyol includes polyester polyols such as polycaprolactone polyols; polycarbonate polyols; polyestercarbonate polyols; polyurethane polyols; polyether polyols; and combinations thereof.

In accordance with the preceding and other embodiments, the at least one polyol preferably has a molecular weight greater than 300, i.e., a $M_n$, greater than 300. Polyols with a molecular weight greater than 300 improve formability of the cured coating. It should be understood that the at least one polyol having a molecular weight greater than 300 is not mutually exclusive from the monomeric or polymeric polyols discussed herein. The monomeric, polymeric, or both monomeric and polymeric polyols may have a molecular weight greater than 300.

In accordance with the preceding and other embodiments, the at least one polyol includes a low molecular weight polyol having a molecular weight less than or equal to 300. Unless otherwise indicated herein, the term "low molecular weight polyol" refers to polyols having a molecular weight less than or equal to 300, i.e., a $M_n$ less than or equal to 300. The presence of the low molecular weight polyol acts to improve abrasion resistance of the cured coating. It should be understood that the low molecular weight polyol having a molecular weight less than or equal to 300, i.e., the at least one polyol having a low molecular weight less than or equal to 300, is not mutually exclusive from the monomeric or polymeric polyols discussed herein. The monomeric, polymeric, or both monomeric and polymeric polyols may have a molecular weight less than or equal to 300.

In accordance with the preceding and other embodiments, the at least one polyol includes a polyol having a molecular weight greater than 300 and a low molecular weight polyol having a molecular weight less than or equal to 300. Further in accordance with the preceding and other embodiments, the at least one polyol is selected from a polyol having a molecular weight greater than 300, a low molecular weight polyol having a molecular weight less than or equal to 300, and combinations of a polyol having a molecular weight greater than 300 and a low molecular weight polyol having a molecular weight less than or equal to 300.

When used together, the combination of the polyol having a molecular weight of greater than 300 and a low molecular weight polyol having a molecular weight less than or equal to 300 provides both abrasion resistance and formability to coatings cured from the coating compositions disclosed herein. In accordance with such embodiments, the weight ratios of the polyol having a molecular weight greater than 300 to the low molecular weight polyol having a molecular weight less than or equal to 300 ranges from 10:0.1 to 0.1:10, preferably from 1:5 to 5:1.

In accordance with certain embodiments, the coating compositions comprise water. In accordance with such embodiments, the coating composition comprises from about 0.1% to about 20% by weight of water, including from about 0.2% to about 10% by weight, including from about 1% to about 6% by weight, based on the total weight of the coating composition. In accordance with the preceding and other embodiments, when water is present, the coating composition comprises the hydrolysis products and partial condensates of the blocked isocyanate silane and water. In the presence of water, alkoxy functional groups present on the silane may be cleaved into a hydroxyl group attached to the silane (i.e., a silanol) and an alcohol. The initial hydrolysis may also be followed by the condensation of silanol groups into siloxanes (i.e., compounds with —Si—O—Si— segments). The reaction products of the blocked isocyanate silane of the present disclosure and water is referred to herein as the hydrolysis products and partial condensates of these two components. The further polymerization (such as condensation polymerization) of the hydrolysis products and partial condensates necessary to form the organosiloxane coating may occur with the removal of water (and any solvent that may be present) from the coating composition during cure. In accordance with certain embodiments, an organic acid, such as acetic acid, or a mineral acid, such as hydrochloric acid, is used to catalyze, control, or both catalyze and control the formation of the hydrolysis products and partial condensates.

In accordance with certain embodiments, the coating compositions may further comprise a solvent. Examples of suitable solvents that may be used with the coating compositions include, but are not limited to, methanol, ethanol, isopropanol, n-propanol, n-butanol, 1-methoxy-2-propanol and 1-butoxy-2-propanol, and mixtures thereof. The selection of the solvent may assist in the coating process, e.g., to obtain desired coating thickness or to improve the appearance of the resulting coating. In accordance with the preceding and other embodiments, the coating compositions comprise from 20% to 90% by weight of solvent, including from about 30% to about 80% by weight, including from about 40% to about 75% by weight, based on the total weight of the coating composition.

In accordance with certain embodiments, the coating compositions may further comprise an organic blocked isocyanate. Unless otherwise indicated herein, the term "organic blocked isocyanate" refers to a blocked isocyanate compound that is free of silicon atoms, i.e., a silane-free blocked isocyanate. Suitable organic blocked isocyanates used in the coating compositions have at least one blocked isocyanate group. Preferably, the organic blocked isocyanates are polyisocyanates, i.e., compounds having more than one isocyanate functional group such as diisocyanates, triisocyanates, etc.

Non-limiting examples of suitable organic blocked isocyanates include blocked polyisocyanates based on a hexamethylene diisocyanate (HDI); isophorone diisocyanate (IPDI); blocked cyclohexylene diisocyanates, such as 1,4-cyclohexylene diisocyanates; blocked dicyclohexylmethane diisocyanates, such as 4,4'-diisocyanato-dicyclohexylmethanes; xylylene diisocyanates (XDI); tetramethylxylene diisocyanates (TMXDI); toluene diisocyanates (TDI); naphthalene diisocyanates (NDI); phenylene diisocyanates; toluidine diisocyanates (TODI); diphenylmethane diisocyanates (MDI); any diisocyanates derived from the foregoing, triisocyanates, and combinations thereof. Blocked polyisocyanates based on HDI and IPDI are considered blocked aliphatic polyisocyanates, and are preferred when organic blocked isocyanates are used in the coating composition. Commercial examples of organic blocked isocyanates based on HDI include DESMODUR BL 3175A, DESMODUR BL 3370, Trixene BI 7960, Trixene BI 7961, Trixene BI 7982, and Trixene BI 7984 (where the DESMODUR products are available from Bayer MaterialScience of Germany and the Trixene products are available from Baxenden Chemicals of the United Kingdom). Commercial examples of organic blocked isocyanates based on IPDI include DESMODUR BL 3370 (of Bayer MaterialScience) and Trixene BI 7950 (of Baxenden Chemicals).

Suitable blocking agents used to block the organic blocked isocyanates include active methyl-type, lactam-type, alcohol-type, oxime-type, and phenolic-type blocking agents. Non-limiting examples of blocking agents include dimethylpyrazole (DMP), i.e., 3,5-dimethylpyrazole; methylethylcetoxime (MEKO); diethyl malonate (DEM); and the like.

In accordance with the preceding and other embodiments, the coating composition comprises from about 10% to about 80% by weight of organic blocked isocyanate, including from about 20% to about 70% by weight, including from about 30% to about 60% by weight, based on the total weight of the solids of the coating composition.

It has been discovered that the use of the organic blocked isocyanate in the coating compositions disclosed herein improves the formability of the cured coating. That is, although the coating compositions are formable without the organic blocked isocyanate, the inclusion of the organic blocked isocyanate further contributes to the formability of the cured coating. In accordance with certain embodiments, the coating compositions disclosed herein that contain about 20% to about 70% by weight of organic blocked isocyanate have a formability radius of less than about 2.5 centimeters (cm). The formability rating measured in terms of formability radius is discussed in greater detail in the Analytical Methods section below.

In accordance with certain embodiments, the coating compositions may further comprise a metal oxide sol. The metal oxide sol is an aqueous or organic solvent colloid with metal oxide particulate matter forming the solid phase of the sol. Examples of metal oxide particulate matter include titania, zirconia, tin oxide, antimony oxide, iron oxide, lead oxide, bismuth oxide, silica, alumina, and combinations thereof. The preferred metal oxide sol for use with the coating compositions described herein includes colloidal silica.

Because the surface of the colloidal silica includes surface bound hydroxyls, colloidal silica is considered a reactive material that can react with other materials that are reactive with hydroxyl functional groups. Therefore, as contemplated herein, the colloidal silica is added as a reactive material to the coating compositions in accordance with this embodiment of the present invention. Commercially available colloidal silica may differ by particle size, silica concentration, pH, presence of stabilizing ions, solvent makeup, and the like. One of ordinary skill in the art would understand that substantially different product properties can be obtained through the selection of different colloidal silicas.

In accordance with the preceding and other embodiments, the coating composition comprises from 0 to about 30% by weight of a metal oxide sol, including from about 1% to about 20% by weight, including from about 5% to about 15% by weight, based on the total weight of the solids of the coating composition.

Certain plastic substrates having aromatic moieties, such as polycarbonates, are susceptible to weathering, which is the degradation of the polymer from exposure to ultraviolet (UV) light. To improve the service life, and hence, weatherability of these plastics, a coating containing a UV-absorber, or alternatively, a light stabilizer such as a hindered amine light stabilizer (HALS), may be applied to the plastic substrate.

In accordance with certain embodiments, the coating composition may further comprise a UV absorber, a hindered amine light stabilizer, and combinations thereof. Examples of suitable UV absorbers that may be used in the coating compositions include, but are not limited to, 2-hydroxy-benzophenones (BPs) (commercial examples include CHIMASSORB 81 and CHIMASSORB 90, both available from BASF of Germany); 2-(2-hydroxyphenyl)-benzotriazoles (HPBTs) (commercial examples include TINUVIN 1130, TINUVIN 384-2, TINUVIN 928, and TINUVIN 900 (all from BASF); and 2-hydroxyphenyl-s-triazines (HPTs) (commercial examples include, but are not limited to, TINUVIN 400, TINUVIN 405 (both from BASF). Examples of suitable HALS that may be used in the coating compositions include, but are not limited to, 2,2,6,6-tetramethyl piperidine and its derivatives (commercial examples include TINUVIN 152, TINUVIN 292, both from BASF).

In accordance with certain embodiments, the coating compositions may further comprise an alkoxysilane. Unless otherwise indicated herein, the term "alkoxysilane" refers to a silane that has at least one alkoxy functional group bonded to a silicon atom in the silane. Preferably, the alkoxy functional group of the alkoxysilane is a methyl or ethyl group. Examples of suitable alkoxysilanes that may be used in the coating composition include, but are not limited to, epoxy functional alkoxysilanes, tetrafunctional alkoxysilanes, and combinations thereof.

Non-limiting examples of suitable epoxy functional alkoxysilanes include glycidoxymethyltrimethoxysilane, 3-glycidoxypropyltrihydroxysilane, 3-glycidoxypropyldimethylhydroxysilane, 3-glycidoxypropyltrimethoxysilane, 3-glycidoxypropyltriethoxysilane, 3-glycidoxypropyldimethoxymethylsilane, 3-glycidoxypropyldimethylmethoxysilane, 3-glycidoxypropyltributoxysilane, and the like.

Non-limiting examples of suitable tetrafunctional alkoxysilanes include tetramethyl orthosilicate, tetraethoxysilane (also known as tetraethyl orthosilicate or TEOS), tetrapropyl orthosilicate, tetraisopropyl orthosilicate, tetrabutyl orthosilicate, tetraisobutyl orthosilicate, tetrakis(methoxyethoxy)silane, tetrakis(methoxypropoxy)silane, tetrakis(ethoxyethoxy)silane, tetrakis(methoxyethoxyethoxy)silane, trimethoxyethoxysilane, dimethoxydiethoxysilane, triethoxymethoxysilane, poly(dimethoxysiloxane), poly(diethoxysiloxane), poly(dimethoxy-diethoxysiloxane), tetrakis(trimethoxysiloxy)silane, tetrakis(triethoxysiloxy)silane, and the like.

Although not an inherent property of organosiloxane coatings or a property that is easily incorporated into abrasion-resistant organosiloxane coatings, anti-fog (also referred to as anti-frost) is an additional property that is desirable for abrasion-resistant organosiloxane coatings. Fog appears when moisture condenses on a surface of the coating and is drawn into tiny droplets that scatter light. The scattering of the light gives the surface the appearance of a fog. One way a coating works to prevent fogging is to absorb the condensed moisture into the surface preventing the tiny light scattering droplets from forming. However, at some point this type of coating surface may reach saturation, thus resulting in the formation of light scattering water droplets on the surface and also resulting in poor anti-fog properties. Another way to prevent fogging is to modify the coating in a manner so as to cause the water droplets to spread or sheet across the surface, which is an effect called wetting, thereby minimizing the light scattering effect of the water droplets.

This water spreading or sheeting property can be incorporated into the coating using surface active agents, which are also known as surfactants, to improve water wetting on the surface of the coating. In accordance with certain embodiments, the coating compositions may further comprise a surfactant. Surfactants generally contain both hydrophilic and hydrophobic segments and are used to impart the properties of these segments on the surfaces of the coating, including surfaces of organosiloxane polymer coatings. These surfactants can be applied externally by wiping or spraying the surfactant on the surface to form a temporary anti-fog film. Such surfactants that are only externally applied or mixed in with the coating easily wash off or leach away from the cured coating when exposed to water washing (as exhibited herein by water soaking), thereby resulting in the dissipation of the anti-fog properties for the coating surface. Alternatively, the surfactants can be mixed in with the coating composition as an additive before it is applied to a surface, so that the surfactant becomes mixed within the physical (i.e., polymer) structure of the coating as the coating composition cures. A more permanent or durable anti-fog property can be obtained if the surfactants can be tethered to the network. This is possible by ionic interaction or covalent bonding of the surfactant to the polymeric structure of the coating. Unless otherwise indicated herein, a surfactant that ionically or covalently bonds to the polymeric structure of the coating composition is referred to herein as a "reactive surfactant." In certain embodiments, the reactive surfactant comprises at least one hydroxyl group that can react with isocyanates (e.g., regenerated isocyanates following heat treatment). Non-limiting examples of reactive surfactants that may be used in the coating compositions disclosed herein include CIRRASOL G-265 (commercially available from Croda of New Castle, Del.), which is a polyethylene oxide functional quaternary ammonium surfactant, and choline dodecylbenzene sulfonate. Other examples of suitable reactive surfactants that can be used include, but are not limited to, hydroxyl bearing ammonium compounds such as triethanol-, diethyldiethano-, and ethyltriethanolammonium salts.

Alternatively, a surfactant added to the coating composition that does not ionically or covalently bond with the polymeric structure of the coating composition is referred herein to as a "non-reactive surfactant." Non-limiting examples of non-reactive surfactants that may be used in the coating compositions disclosed herein include ionic surfactants such as the anionic surfactant sodium dioctyl sulfosuccinate (commercially available as OT-75 from Cytec Industries Inc. of Woodland Park, N.J.) and the cationic surfactant ethylsulphonate (commercially available as SCHERCOQUAT IAS-PG from Lubrizol Advanced Materials Inc. of Cleveland, Ohio). Other examples of suitable non-reactive surfactants that can be used include, but are not limited to, salts of sulfonic acids such as salts of dodecylbenzene sulfonic acid, naphthalene sulfonic acid, lignin sulfonic acid, petroleum sulfonic acid, paraffin sulfonic acid, and the like. In accordance with certain embodiments, the coating compositions may comprise a reactive surfactant, a non-reactive surfactant, and combinations thereof.

In accordance with the preceding and other embodiments, a reactive surfactant, a non-reactive surfactant, and combinations reactive and non-reactive surfactants may be present in the coating compositions in an amount ranging from about 0.1% to about 50% by weight, including from about 1% to about 30% by weight, including from about 1% to about 20% by weight, based on the total weight of the solids of the coating composition.

In accordance with certain embodiments, the coating composition further comprises a silane polymerization catalyst. Although the silane polymerization catalyst is not an essential ingredient of the coating compositions of this disclosure, the addition of such a catalyst can affect abrasion resistance and other properties of the coating including stability, tinting capacity, porosity, cosmetics, caustic resistance, water resistance and the like. The amount of catalyst used can vary widely, but when present will generally be in an amount sufficient to provide from about 0.01% to about 10% by weight, based on the total solids of the composition. Examples of such silane polymerization catalysts include, but are not limited to (i) metal acetylacetonates, (ii) diamides, (iii) imidazoles, (iv) amines and ammonium salts, (v) organic sulfonic acids and their amine salts, (vi) alkali metal salts of carboxylic acids, (vii) alkali metal hydroxides and (viii) fluoride salts. Thus, examples for group (i) include compounds such as aluminum, zinc, iron and cobalt acetylacetonates; an example for group (ii) includes dicyandiamide; examples for group (iii) include compounds such as 2-methylimidazole, 2-ethyl-4-methylimidazole, and 1-cyanoethyl-2-propylimidazole; examples for group (iv) include compounds such as benzyldimethylamine, and 1,2-diaminocyclohexane; examples for group (v) include compounds such as trifluoromethanesulfonic acid; examples for group (vi) include compounds such as sodium acetate, examples for group (vii) include compounds such as sodium hydroxide, and potassium hydroxide; and examples for group (viii) include compounds such as tetra n-butyl ammonium fluoride, and the like.

In accordance with certain embodiments, the coating composition further comprises a leveling agent, which may also be referred to as a flow control agent. The leveling agent acts to spread the coating composition more evenly or to level the composition on the surface of the substrate, as well as to provide substantially uniform contact with the substrate. The amount of the leveling or flow control agent can vary widely, but can be an amount sufficient to provide the coating composition with from about 0.001% to about 10% leveling agent by weight solids of the coating composition. Any conventional, commercially available leveling or flow control agent which is compatible with the coating composition and the substrate, which is capable of leveling the coating composition on a substrate, and which enhances wetting between the coating composition and the substrate can be employed. Non-limiting examples of such leveling agents include polyethers (commercially available as TRITON X-100, X-405, and N-57 from Rohm and Haas of Philadelphia, Pa.), silicones (commercially available as PAINT ADDITIVE 3, PAINT ADDITIVE 29, and PAINT ADDITIVE 57 from Dow Corning of Midland, Mich., and SILWET L-77 and SILWET L-7600 from Momentive of Columbus, Ohio), fluorosurfactants (commercially available as FLUORAD FC-4430 from 3M Corporation of St. Paul, Minn.), polyacrylates, silicone polyacrylates such as silicone hexaacrylate, and fluoro-modified polyacrylates.

The coating compositions disclosed herein are applied as a coating to rigid substrate surfaces or to firm substrate surfaces that are sufficiently elastic to withstand further processing of the substrate, such as flexing or bending (e.g., via thermoforming) without loss of the substrate's properties and without undergoing a non-reversible plastic deformation. Nonlimiting examples of suitable substrate materials include transparent plastics such as polycarbonate, polarized polycarbonate, polyamide, polyacrylic, polymethacrylic, polyvinylchloride, polybisallyl carbonate, polyethylene terephthalate, polyethylene naphthenate, polyurethane, and polythiourethane. Other substrates include various polyolefins, fluorinated polymers, metals and glass, such as soda-lime glass, borosilicate glass, acrylic glass among other types of glass, are used with appropriate pretreatments, if necessary. The preferred substrate for the coating compositions disclosed herein include plastic substrates, and more preferably polycarbonate substrates.

The coating compositions described herein are applied in any suitable manner to a substrate. For example, the compositions of the present disclosure are applied to solid substrates by conventional methods, such as flow coating, spray coating, curtain coating, dip coating, spin coating, roll coating, and the like to form a continuous surface film on the substrate.

Curing Conditions

It is well known that an isocyanate reacts with a hydrogen-containing group, including hydroxyl groups and amino groups, to form stable urethane linkages (via isocyanate and hydroxyl reactions) or urea linkages (via isocyanate and amino reactions). Thus, in the context of the coating compositions disclosed herein, the curing (crosslinking) reaction for the coating composition between the blocked isocyanate silane and hydroxyl-containing polyol will initiate upon thermal (heat) treatment that is sufficient to regenerate the isocyanate functionality of the silane (i.e., release the blocking agent from the blocked isocyanate silane). One of ordinary skill in the art will understand that the cure conditions are a function of the blocked isocyanate blocking group, time, temperature, presence of water or other solvents, and composition (type) of the substrate among other factors. Typically, after applying the coating composition to the substrate, the coating composition may be allowed to dry under ambient conditions for at least 1 minute up to 200 minutes prior to curing. In accordance with the embodiments disclosed herein, the cure conditions include heating the coating composition applied to the substrate at a temperature of at least 80° C. for at least 10 minutes up to about 500 minutes. In certain embodiments, when the substrate is polycarbonate, the cure conditions include heating the coating composition applied to the substrate at a temperature of at least about 100° C. for at least about 60 minutes, including heating the coating composition at about 100° C. to about 140° C. for about 20 minutes to 200 minutes.

Other Embodiments

In accordance with certain embodiments, processes for making the coating composition are disclosed. In one embodiment, the process includes mixing the blocked isocyanate silane with water to form a mixture comprising hydrolysis products and partial condensates of the blocked isocyanate silane and water; and mixing the mixture with the at least one polyol to form the coating composition. In other words, according to this embodiment, hydrolysis products and partial condensates resulting from the mixing of the water and blocked isocyanate silane are formed first before the polyols are mixed in with the hydrolysis products and partial condensates. In accordance with this embodiment, other optional components of the coating composition disclosed herein may be added prior to the polyols being introduced. For example, in accordance with certain embodiments, solvent, organic acid, or combinations of both solvent and organic acid may be mixed in with the water and blocked isocyanate silane prior to the mixing of the polyols. In accordance with the preceding and other embodiments, other optional components may also be mixed in prior to the polyols, including but not limited to the organic blocked isocyanate, the alkoxysilane, the colloidal silica, and combinations thereof.

Alternatively, in accordance with another embodiment, the process for making the coating compositions includes adding all of the components together at the same time. The blocked isocyanate silane and any optional alkoxysilane ingredients may still hydrolyze in the presence of the water and the optional solvent and organic acid. However, in accordance with this disclosure, it is preferred that the blocked isocyanate silane and water, and optional solvent and organic acid are mixed prior to the introduction of the polyols because this provides better control of the hydrolysis of the silanes and facilitates completion of the hydrolysis in a shorter, or at least more discrete, period of time.

In accordance with certain embodiments, articles are provided. The articles comprise a substrate and a coating coated on at least one surface of the substrate. The coating is prepared by thermal curing the coating compositions disclosed herein on the substrate in accordance with the manner disclosed herein. In accordance with certain of the preceding and other embodiments, the coating is prepared by thermal curing the coating composition on the substrate at a temperature of at least 100° C. for at least 60 minutes. Furthermore, In accordance with certain embodiments, the substrate is a transparent polymer. In accordance with certain of the preceding and other embodiments, the substrate is a polycarbonate plastic.

As mentioned above, the coating compositions disclosed herein have excellent adhesion to the substrate. In accordance with certain embodiments, it is unnecessary to use a primer on the substrate for the coating composition. Thus, in accordance with certain embodiments, no primer is disposed between the substrate and the coating in the articles disclosed herein, i.e., the article coated with the coating composition is primer-free. In accordance with certain embodiments, the coating is applied to a polycarbonate substrate without a primer to form an article. In such embodiments, 100% adhesion is achieved following the initial adhesion test (as described below in the Analytical Methods section) to the article. In accordance with this embodiment, 100% adhesion is achieved following the 1 hour boiling water adhesion test (as described below in the Analytical Methods section) to the article. In accordance with certain embodiments, the coating is applied to a polycarbonate substrate without a primer to form an article. In other embodiments, a primer is disposed between the substrate and the coating composition in the article.

Unless otherwise indicated herein, the terms "formable" and "formability" shall be understood as referring to cured coatings that can be bent at a radius of less than about 25 cm, in accordance with the formability test discussed below in the Analytical Methods section. In accordance with certain embodiments discussed herein, when cured on a polycarbonate substrate having a thickness of 3 mm, the article has a formability radius of less than about 25 cm without cracking or crazing the coating. In accordance with certain embodiments, the cured coatings can be bent at a radius of about 2.5 cm in accordance with the above procedure without cracking or crazing the coating. In accordance with certain of the preceding embodiments, the substrate was a polycarbonate sheet.

In addition, as mentioned above, the coating compositions disclosed herein are abrasion resistant. The abrasion resistance is evident based on the Taber Abrasion numbers obtained for the cured coating compositions according to the Analytical Methods section disclosed below. In particular, in accordance with certain embodiments, when cured on a polycarbonate substrate having a thickness of 3 mm, the coatings prepared from the coating compositions disclosed herein have Taber Abrasion numbers less than about 30%, including less than about 20%, including less than about 10%, or less than about 5% for 100 cycles. In other embodiments, the coatings prepared from the coating compositions disclosed herein have Taber Abrasion numbers less than about 45%, including less than about 30%, including less than about 15% for 500 cycles.

Furthermore, in accordance with certain embodiments, the coating compositions disclosed herein are weatherable. Coatings that are weatherable provide excellent resistance to the damaging effects due to weather, e.g., effects due to rain, temperature, sunlight, etc. Unless otherwise indicated herein, the term "weatherable" refers to a coating composition that exhibits a haze gain less than 2% and a yellow index of less than 15 when subjected to 400 hours of QUV-B weather test conditions (as set forth in the Analytical Methods section below). Thus, in accordance with certain embodiments, the coating compositions disclosed herein have haze gain less than 2% and a yellow index of less than 15, including a haze gain less than 1% and a yellow index of less than 5, when subjected to 400 hours of QUV-B weather test conditions. Furthermore, in accordance with certain embodiments, the coating compositions disclosed herein have a yellow index gain of less than 5, including less than 2, and including less than 1, when subjected to 400 hours of QUV-B weather test conditions (the yellow index gain being the difference between the yellow index after exposure to the weather test conditions and the initial yellow index).

Analytical Methods

Solids Content

Solids content was measured by heating the liquid coating for 30 min at 130° C. using a Sartorius Moisture Analyzer Model MA 35.

Film Thickness

Film thickness of cured coating was measured with a Filmetrics F20-CP Spectrophotometer at wavelength of 632.8 nanometers (nm) based on spectral reflectance methodology.

Adhesion

Adhesion is the ability of a coating to adhere to a substrate. The initial adhesion was tested using a roll of pressure sensitive tape 3M Brand SCOTCH™ 600 tape. The test was carried out as follows: 1) a cross-hatch of a 6×5 grid, approximately 2 mm apart was made with a retractable razor blade into the cured coating; 2) the tape was pressed down firmly (using a tongue depressor) over the cross-hatched area; 3) a check for the removal of the coating was made by examination of the coated substrate using appropriate visual control; 4) steps 2) and 3) were repeated for two additional times to the same area; 5) the cross-hatched area was rubbed with Japanese steel wool 0000 and blown dry with air to remove loose steel wool residue; 6) the subject area was inspected under a microscope; 7) the actual count of unaffected areas was reported as percent adhesion (when adhesion was affected along a line only, the estimate is converted into percentages). The adhesion was also tested in the same manner as above for certain samples after the coated specimen is soaked in boiling water for 1 hour.

Formability

The formability of the coatings was tested in the following manner. An oven with a glass plate was preheated to 165° C. A 2.5 centimeters (cm)×10 cm×3 millimeters (mm) coated MAKROLON polycarbonate (Bayer MaterialScience, Germany) test specimen was placed flat on a flat surface and heated at 160° C. for 12 min. The thickness of the coating was from about 1-30 micrometer (µm) or about 2-20 µm. The sample was removed from the oven and immediately placed on a cylindrical mandrel. The formability of the sample was rated by determining the minimal radius of the mandrel where no cracking, flaking, or detachment of the coating is observed. The formability values reported in the examples below represent the minimal measured radius of the mandrel where no cracking, flaking, or detachment of the coating is observed.

Haze

The evaluation of light transmission and light-scattering properties was performed by measuring haze according to ASTM D 1003 with a suitable hazemeter. In the present disclosure, a Haze-gard Plus (BYK-Gardner, Columbia, Md.) was used as the hazemeter. The diameter of the respective testing areas were 2.5 cm. Unless otherwise indicated herein, a "clear" sample has a haze of less than 0.5% and no visible reflective haze.

Abrasion Resistance

The measured abrasion resistance of a cured coating on a substrate, whether measured by the Taber Abrasion Test, Steel Wool Test, Eraser Test, Tumble Test, Bayer Test, etc. is a function, in part, of the cure temperature, cure time, coating thickness, and substrate. In general, higher temperatures and longer cure times result in higher measured abrasion resistance. Normally, the cure temperature and cure time are selected for compatibility with the substrate. However, sometimes less than optimum cure temperatures and cure times are used due to process and/or equipment limitations. It will be recognized by those skilled in the art that other variables, such as coating thickness and the nature of the substrate, will also have an effect on the measured abrasion resistance. In general, for each type of substrate and for each coating composition there will be an optimum coating thickness. The optimum cure temperature, cure time, coating thickness, etc. can be readily determined empirically by those skilled in the art.

The Taber Abrasion Test described in the present disclosure was carried out with a Teledyne Model 5150 Taber Abrader (Taber Industries of North Tonawanda, N.Y.) with a 500 g auxiliary load weight and with CS-10F wheels (Taber Industries). Prior to the measurement, the wheels were refaced with the ST-11 refacing stone (Taber Industries). The refacing was performed by 25 revolutions of the CS-10F wheels on the refacing stone. Throughout the testing conducted herein, all of the samples were tested with the same set of CS-10F Taber wheels. The initial haze of the sample was recorded 4 times with a Haze-gard Plus (BYK-Gardner) equipped with a Taber Abrasion holder (BYK-Gardner). After 100 cycles (revolutions) of the CS-10F wheels on the sample, the haze was recorded again 4 times with a Haze-gard Plus equipped with a Taber Abrasion holder (BYK-Gardner). The average haze was then determined for the initial haze reading, and the average haze was then determined for the haze reading after 100 cycles as well as after 500 cycles. The difference between (1) the averaged haze readings at either 100 cycles or 500 cycles and (2) the average initial haze reading is reported herein as the Taber Abrasion number.

Weatherability

To speed up the weathering process, accelerated weathering testing can be applied. One of these methods is known as the QUV accelerated weathering testing that is a laboratory simulation of the damaging forces of weather for the purposes of predicting the relative durability of materials exposed to outdoor environments. Racks of samples are placed in the QUV chamber. Rain and dew systems are simulated by pressurized spray and condensation systems while damaging effects of sunlight are simulated by fluorescent UV lamps. The exposure temperature is automatically controlled. Cyclical weather conditions, such as temperature and moisture, can be simulated. The QUV testing includes at least two types. One type is the QUV-B (medium wavelength UV), while the other is QUV-A (longer wavelength UV). Factors that are used to gauge weathering properties include, but are not limited to, haze and yellow index. Under UV exposure, haze and yellow index, alone or collectively, become higher, indicating weathering degradation of the coated plastic materials.

For QUV-B accelerated weathering testing, the procedure of ASTM G 53-88, standard practice for operating light and water exposure apparatus (fluorescent UV-condensation type) for exposure of nonmetallic materials, was followed. The QUV-B Test described in the present disclosure was performed on a QUV/SE Accelerated Weathering Tester, supplied by Q-LAB Corporation (Cleveland, Ohio). The respective size of the specimens was 102 mm long and 76 mm wide. The cyclic conditions were as follows: 8 hours of exposure at 60° C. to UVB lamps of 0.67 W/m$^2$/nm, followed by 4 hours of condensation at 50° C. The initial haze and yellow index were measured prior to the testing, as well as after 400 hours of exposure.

Yellow index was measured on a Shimadzu UV-1601 UV-VIS spectrophotometer (Shimadzu Scientific Instruments of Kyoto, Japan) in accordance to ASTM E-313.

Anti-Fog Properties: Initial Anti-Fog Test

Initial anti-fog test was carried out by positioning a coated substrate at a standard height above a beaker containing a source of 60° C. water. The coated substrate was exposed to water vapors from the 60° C. water for up to 1 minute. Upon exposure to water vapor, within few seconds a continuous film may form over the entire coated substrate. With the formation of a continuous film, fog would not appear. If fog appeared on the coated substrate during this test, the time taken for the appearance of the fog was recorded. If no fog appeared after 1 minute of exposure, then the coating was considered to "pass" the initial anti-fog test.

Anti-Fog Properties: Breathe Test

Breathe test was carried out by holding the coated substrate about 2.5 to 7.5 cm from the tester. The tester blew on the sample so as to intentionally create fog. If no fog appeared on the coated substrate during the test, the coating composition "passed" the breathe test. If fog appeared on the surface, then the coating composition failed this test.

Anti-Fog Properties: Wipe Test

The anti-fog wipe test was carried out by positioning a coated substrate at a standard height above beaker containing water at 80° C. for 2 minutes. The appearance of fog was evaluated for the 2 minutes. If no fog appeared during this time interval, the substrate was removed from the test, wiped with a wet cloth and allowed to recover for 30 minutes. The anti-fog test was then repeated by exposing the "wiped" coating to water vapor at 80° C. for an additional 2 minutes. The number of wipes after which anti-fog performance was retained was then recorded.

Anti-Fog Properties: After-Washing Test

Anti-fog after washing test was carried out as follows: the coated substrate was soaked in water at room temperature for 1 hour. After 12 hours in which the coated substrate recovered and dried from the soaking, the coated substrate was tested for anti-fog. In particular, the coated substrate was placed above beaker containing water at 50° C. for 1 minute. On exposure to water vapor, within few seconds a continuous film may form over the entire coated substrate. With the formation of a continuous film, fog would not appear. If fog appeared on the coated substrate during this test, the time taken for the appearance of the fog was recorded. If no fog appeared after 1 minute of exposure, then the coating "passed" the initial after-washing anti-fog test.

Fourier Transform Infrared Sprectroscopy (FT-IR tests)

FT-IR tests were conducted on a NICOLET™ iS-10 FT-IR spectrometer (Thermo Fisher Scientific Inc. of Waltham, Mass.).

EXAMPLES

The following examples are for purposes of illustration only and are not intended to limit the scope of the claims which are appended hereto. All references cited herein are specifically incorporated by reference.

Descriptions of Ingredients Used in the Examples

BYK 333: a silicone surface additive (BYK-Chemie GmbH of Wesel, Germany).

CAPA 3031: a polycaprolactone triol, average molecular weight 300 (Perstorp of Perstorp, Sweden).

CAPA 3041: a polycaprolactone triol, average molecular weight 400 (Perstorp).

CAPA 4101: a polycaprolactone tetraol, average molecular weight 1000 (Perstorp).

Choline/DDBS: Choline dodecylbenzene sulfonate, prepared according to U.S. Pat. No. 5,877,254.

DAA: Diacetone alcohol.

DESMODUR BL 3175A: a blocked aliphatic polyisocyanate based on hexamethylene diisocyanate (Bayer MaterialScience of Leverkusen, Germany).

DESMOPHEN C 1200: an aliphatic polyestercarbonate diol, average molecular weight 2000 (Bayer MaterialScience).

GPTMS: 3-glycidoxypropyltrimethoxysilane.

IPA: isopropanol alcohol.

MTMS: methyltrimethoxysilane.

N-1034A: colloidal silica (Nalco of Naperville, Ill.).

PA-57: a flow control agent (Dow Chemicals of Midland, Mich.).

PB: 1-butoxy-2-propanol.

PM: 1-methoxy-2-propanol.

IPTES: 3-isocyanatopropyltriethoxysilane (Momentive Performance Materials of Wilton, Conn.).

IPTMS: 3-isocyanatopropyltrimethoxysilane (Momentive Performance Materials).

SILWET L-7657: a flow control agent (Momentive Performance Materials).

DHBP-IPTES: Adduct of 2,4-Dihydroxybenzophenone and 3-isocyanatopropyltriethoxysilane.

TEOS: Tetraethoxysilane.

TINUVIN 1130: a hydroxyphenyl-benzotriazole UV absorber (BASF).

TINUVIN 384-2: a hydroxyphenyl-benzotriazole UV absorber (BASF).

TINUVIN 152: a HALS (BASF).

TMP: trimethylolpropane.

CIRRASOL G-265: A quaternary ammonium surfactant having two polyethylene oxide side chains and a hydrophobic chain containing stearamide functionality (Croda).

OT-75: A non-reactive anionic surfactant salt solution (75% in water and alcohol) of sodium dioctyl sulfosuccinate (Cytec).

SCHERCOQUAT IAS-PG: A non-reactive cationic surfactant salt solution of ethylsulphonate (Lubrizol Advanced Materials).

Substrates

Polycarbonate sheets used in the following examples are MAKROLON brand sheets (Bayer MaterialScience).

Polycarbonate lenses used in the following examples are all from Gentex (of Zeeland, Mich.).

Example 1: Preparation of Blocked Isocyanate Silane (BL-Si-1)

41 grams (g) of 3-isocyanatopropyltrimethoxysilane (IPTMS) was added to a 250 milliliter (mL) round bottom flask. 18.2 g of 2-butanone oxime was then added dropwise along with magnetic stirring of the mixture. The temperature of the reacting mixture was controlled to be less than 80° C. After the addition was finished, the stirring was continued for another 2 hours. The FT-IR spectrum analysis showed that no isocyanate peak was present, indicating a complete reaction of 3-isocyanatopropyltrimethoxysilane. The resulting adduct is referred to herein as BL-Si-1.

Example 2: Preparation of Blocked Isocyanate Silane (BL-Si-2)

494.8 g of 3-isocyanatopropyltriethoxysilane (IPTES) was added to a 2 liter (L) round bottom flask. 182 g of 2-butanone oxime was then added dropwise along with magnetic stirring of the mixture. The temperature of the reacting mixture was controlled to be less than 80° C. After the addition was finished, the stirring was continued for another 2 hours. The FT-IR spectrum analysis showed that no isocyanate peak was present, indicating a complete reaction of 3-isocyanatopropyltriethoxysilane. The resulting adduct is referred to herein as BL-Si-2.

Example 3: Hydrolysis Products of BL-Si-2 (HC-2)

A hydrolysis composition was made by adding the ingredients shown in Table 1, measured in parts per total 100 parts.

TABLE 1

| Example 3 (HC-2) | |
| --- | --- |
| BL-Si-2 | 49.9 |
| IPA | 24.9 |
| acetic acid | 7.8 |
| water | 17.4 |

BL-Si-2 was added to a plastic beaker. IPA, acetic acid, and water were then added along with magnetic stirring. The mixture was then stirred for at least 12 hours at ambient temperature. The resulting composition of hydrolysis products and partial condensates is referred to herein as HC-2.

Example 4: Coating Composition with HC-2

Coating composition was made by adding the ingredients shown in Table 2, measured in parts per total 100 parts.

TABLE 2

| Example 4 | |
| --- | --- |
| HC-2 | 38.6 |
| CAPA 4101 | 12.4 |
| PM | 49.0 |
| choline acetate | 0.04 |
| BYK 333 | 0.04 |

To a plastic container, HC-2, CAPA 4101, PM, choline acetate, and BYK 333 were added, followed by stirring for at least 5 hours to fully dissolve and mix all of the ingredients.

The resulting coating composition was flow-coated on a polycarbonate sheet with a 3 mm thickness, a 15.2 cm in width, and a 25.4 cm length. 20 minutes of drying followed by 120 minutes of curing at 129° C. resulted in a clear and abrasion-resistant coating on the polycarbonate sheet. Initial haze at the bottom of the coated sheet was 0.3%. The Taber Abrasion number (haze gain) was 3.1% haze at 100 cycles and 14.8% at 500 cycles.

The initial adhesion was 100%. After placing the coated specimen in boiling water for 1 hour, adhesion of the coating on the polycarbonate sheet was 100%.

Comparative Example A: Coating Composition without Blocked Isocyanate Silane The coating composition of this example is comparable to that in Example 4. Notably, the primary difference is that MTMS, water, IPA, and BL 3175A were used in this example as compared to the use of the blocked isocyanate silane (in the form of HC-2) in Example 4.

The coating composition was made by adding the ingredients shown in Table 3, measured in parts per total 100 parts.

TABLE 3

| Comparative Example A | |
| --- | --- |
| MTMS | 8.4 |
| water | 5.6 |
| IPA | 8.4 |
| CAPA 4101 | 10.1 |
| BL 3175A | 11.2 |
| PM | 56.2 |
| choline acetate | 0.03 |
| BYK 333 | 0.03 |

To a plastic container, MTMS, water, IPA, CAPA 4101, BL3175A, PM, choline acetate, and BYK 333 were added, followed by stirring for at least 5 hours to fully dissolve and mix all of the ingredients.

The resulting coating composition was flow-coated on a polycarbonate sheet with a 3 mm thickness, a 15.2 cm width, and a 25.4 cm length. After 20 minutes of drying, the coated sheet was cured for 120 minutes of curing at 129° C. All across the sheet, the resulted coating has significant cosmetic defects that include dotted and large defects of coating integrity (the coating had discontinuous regions spaced, for example, about 2 mm apart). Haze was measured to be from 0.3% to 1.1%, depending on the region. The coating is considered as not suitable for use in a transparent application.

Example 5: Coating Composition with HC-2

Coating composition was made by adding the ingredients shown in Table 4, measured in parts per total 100 parts.

TABLE 4

| Example 5 | |
| --- | --- |
| BL3175A | 12.7 |
| TMP | 1.8 |
| CAPA 4101 | 7.6 |
| HC-2 | 25.4 |
| DESMOPHEN C 1200 | 1 |
| PM | 51.4 |
| SILWET L-7657 (10% in PM) | 0.04 |

To a plastic container, DESMODUR BL 3175A, TMP, CAPA 4101, HC-2, DESMOPHEN C 1200, PM, and SILWET L-7657 were added, followed by stirring for at least 30 minutes to fully dissolve and mix all of the ingredients.

The resulting coating composition was flow-coated on a polycarbonate sheet with a 3 mm thickness, a 15.2 cm in width, and a 25.4 cm length. 20 minutes of drying followed by 120 minutes of curing at 129° C. resulted in a clear and abrasion-resistant coating on the polycarbonate sheet. Initial haze at the bottom of the coated sheet was 0.37%. The Taber Abrasion number (haze gain) was 3.4% haze at 100 cycles and 11% haze at 500 cycles.

The initial adhesion of the coating was 100%. After placing the coated specimen in boiling water for 1 hour, adhesion of the coating on the polycarbonate sheet was 100%.

Example 6: Weatherable Coating Composition with HC-2

Coating composition was made by adding the ingredients shown in Table 5, measured in parts per total 100 parts.

TABLE 5

| Example 6 | |
| --- | --- |
| BL 3175A | 11.8 |
| TMP | 1.24 |

TABLE 5-continued

| Example 6 | |
|---|---|
| CAPA 3031 | 0.91 |
| CAPA 4101 | 3.54 |
| TINUVIN 1130 | 4.76 |
| TINUVIN 152 | 0.07 |
| HC-2 | 20 |
| choline acetate | 0.003 |
| IPA | 16.7 |
| PM | 41 |
| BYK 333 | 0.002 |

To a plastic container, DESMODUR BL 3175A, TMP, CAPA 3031, CAPA 4101, TINUVIN 1130, TINUVIN 152, HC-2, choline acetate, IPA, PM, and BYK-333 were added, followed by stirring for at least 30 minutes to fully dissolve and mix all of the ingredients.

The resulting coating composition was flow-coated on a polycarbonate sheet with a 3 mm thickness, a 15.2 cm width, and a 30.5 cm length. 20 minutes of drying followed by 120 minutes of curing at 129° C. resulted in a clear and abrasion-resistant coating on the polycarbonate sheet. Initial haze at the bottom of the coated sheet was 0.31%. The Taber Abrasion number (haze gain) was 1.8% haze at 100 cycles and 5.7% haze at 500 cycles.

An evaluation of the foil lability showed that the coated sheet is thermoformable on a mandrel of 2.5 cm in radius.

The initial adhesion of the coating was 100%. After placing the coated specimen in boiling water for 1 hour, adhesion of the coating on the polycarbonate sheet was 100%.

The weatherability of this coating was also evaluated. A 10.2 cm×7.6 cm piece of the sample was cut from top (starting at 10.2 cm from the top). Initial haze and yellow index of the cut sample were 0.29% and 1.44, respectively. After 400 hours of exposure under QUV-B conditions, haze and yellow index were measured to be 0.31% and 1.91. The actual gain of haze and yellow index are 0.02% and 0.47, respectively, indicating excellent weatherable properties of the coating.

Example 7: Weatherable Coating Composition with HC-2

Coating composition was made by adding the ingredients shown in Table 6, measured in parts per total 100 parts.

TABLE 6

| Example 7 | |
|---|---|
| BL 3175A | 11.5 |
| TMP | 1.2 |
| CAPA 3031 | 0.9 |
| CAPA 4101 | 3.2 |
| DESMOPHEN C 1200 | 0.8 |
| TINUVIN 1130 | 4.8 |
| TINUVIN 152 | 0.07 |
| HC-2 | 20.2 |
| choline acetate | 0.004 |
| PM | 55.2 |
| IPA | 2.1 |
| BYK 333 | 0.01 |
| SILWET L-7657 | 0.03 |

To a plastic container, DESMODUR BL 3175A, TMP, CAPA 3031, CAPA 4101, DESMOPHEN C 1200, TINUVIN 1130, TINUVIN 152, HC-2, choline acetate, PM, IPA, BYK-333, and SILWET L-7657 were added, followed by stirring for at least 5 hours to fully dissolve and mix all of the ingredients.

The resulting coating composition was flow-coated on a polycarbonate sheet with a 3 mm thickness, a 15.2 cm width, and a 30.5 cm length. 20 minutes of drying followed by 120 minutes of curing at 129° C. resulted in a clear and abrasion-resistant coating on the polycarbonate sheet. Initial haze at the bottom of the coated sheet was 0.29%. The Taber Abrasion number (haze gain) was 1.7% haze at 100 cycles and 5.3% haze after 500 cycles.

An evaluation of the formability showed that the coated sheet is thermoformable on a mandrel of 2.5 cm in radius.

The initial adhesion of the coating was 100%. After placing the coated specimen in boiling water for 1 hour, adhesion of the coating on the polycarbonate sheet was 100%.

The weatherability of this coating was also evaluated. A 10.2 cm×7.6 cm piece of the sample was cut from top (starting at 10.2 cm from the top). Initial haze and yellow index of the cut sample were 0.25% and 0.67, respectively. After 400 hours of exposure under QUV-B conditions, haze and yellow index were measured to be 0.30% and 1.45. The actual gain of haze and yellow index are 0.05% and 0.78, respectively, indicating excellent weatherable properties of the coating.

Example 8: Coating Composition with BL-Si-1

Coating composition was made by adding the ingredients shown in Table 7, measured in parts per total 100 parts.

TABLE 7

| Example 8 | |
|---|---|
| N-1034A | 5.5 |
| water | 4.8 |
| IPA | 2.7 |
| MTMS | 5.9 |
| BL-Si-1 | 11.3 |
| DHBP-IPTES | 3.5 |
| acetic acid | 2.5 |
| n-butanol | 54 |
| choline acetate | 0.05 |
| BYK-333 | 0.05 |
| PM | 1 |
| CAPA 4101 | 8.2 |
| TINUVIN 384-2 | 0.50 |

To a plastic container, N-1034A, water, and IPA were added. MTMS, BL-Si-2, and DHBP-IPTES were then added and magnetically stirred for 12 hours. Acetic acid, n-butanol, choline acetate, BYK-33, PM, CAPA 4101, and TINUVIN 384-2 were added, followed by stirring for at least 30 minutes to fully dissolve and mix all of the ingredients.

The resulting coating composition was flow-coated on a polycarbonate sheet with 3 mm in thickness, 15.2 cm in width and 30.5 cm in length. 20 minutes of drying followed by 120 minutes of curing at 129° C. resulted in a clear and abrasion-resistant coating on the polycarbonate sheet. Initial haze at the bottom of the coated sheet was 0.3%. The Taber Abrasion number (haze gain) was 1% haze at 100 cycles and 4.5% haze after 500 cycles.

An evaluation of the formability showed that the coated sheet is thermoformable on a mandrel of 7.5 cm in radius.

The initial adhesion of the coating was 100%. After placing the coated specimen in boiling water for 1 hour, adhesion of the coating on the polycarbonate sheet was 100%.

Example 9: Anti-Fog Coating Composition with BL-Si-2

Coating composition was made by adding the ingredients shown in Table 8, measured in parts per total 100 parts.

TABLE 8

| Example 9 | |
| --- | --- |
| BL-Si-2 | 10 |
| acetic acid | 2 |
| GPTMS | 12 |
| PM | 34.7 |
| TEOS | 6.2 |
| water | 10 |
| CAPA 4101 | 13 |
| PA-57 | 0.1 |
| choline/DDBS | 12 |

To a plastic beaker, 2 g of acetic acid and 34.7 g of PM were added into 10 g of water. 6.2 g of TEOS and 12.0 g of GPTMS were slowly added into the mixture. After 30 minutes of mixing, 10 g of BL-Si-2 was slowly added into the mixture. After stirring overnight, 13.0 g of CAPA 4101 and 12.0 g of choline/DDBS were added into the mixture. 0.01 g of PA-57 was also then added into the mixture.

A polycarbonate lens substrate is dip-coated in the coating composition at a 25 cm/min draw speed. The coated substrate is dried at room temperature for 30 minutes and then cured at 129° C. for 2 hours, resulting in a coated substrate. The initial haze was about 0.2%.

The anti-fog properties of this coating were evaluated. This coated substrate passed the initial anti-fog test and the breathe test. This coated substrate also passed the anti-fog test after washing.

Furthermore, the initial adhesion of this coating was 100%.

Comparative Example B: Coating Composition without Blocked Isocyanate Silane or Polyol The coating composition of this example is comparable to that in Example 9, with the primary difference being that this comparative coating composition was prepared without a blocked isocyanate silane (BL-Si-2) and a polyol (CAPA 4101). In particular, the coating composition was made by adding these ingredients shown in Table 9, measured in parts per total 100 parts.

TABLE 9

| Comparative Example B | |
| --- | --- |
| Acetic acid | 2 |
| GPTMS | 39 |
| PM | 23.5 |
| TEOS | 6.2 |
| water | 17.2 |
| PA-57 | 0.1 |
| choline/DDBS | 12 |

To a plastic beaker, 2 g of acetic acid and 23.5 g of PM were added into 17.2 g of water. 6.2 g of TEOS and 39 g of GPTMS were slowly added into the mixture. After stirring overnight, 12.0 g of choline/DDBS were added into the mixture. 0.01 g of PA-57 is added into the mixture.

A polycarbonate lens substrate is dip-coated in the coating composition at a 25 cm/min draw speed. The coated substrate is dried at room temperature for 30 minutes and then cured at 129° C. for 2 hours, resulting in a coated substrate. The initial adhesion of the coating was 0%.

Comparative Example C: Preparation of an Adduct of an Isocyanate Silane and a Polyol To a round bottom flask, 49.9 g of 3-isocyanatopropyl-triethoxysilane (IPTES) was added. With magnetic stirring, 50.1 g of CAPA 4101 was added slowly. 0.01 g of dibutyltindilaurate was then added to the mixture. The mixture was stirred for 4 hours. FT-IR spectrum showed that no isocyanate peak was present, indicating a complete reaction of 3-isocyanatopropyltriethoxysilane. The resulting adduct referred to herein as CAPA 4101/A-25.

Comparative Example D: Coating Composition with CAPA 4101/A-25

The coating composition of this example is comparable to that in Example 9, with the primary difference being that this comparative coating composition was prepared using the CAPA 4101/A-25 instead of the blocked isocyanate silane (BL-Si-2) and the standalone polyol (CAPA 4101). In particular, the comparative coating composition of this example was made by adding these ingredients shown in Table 10, measured in parts per total 100 parts.

TABLE 10

| Comparative Example D | |
| --- | --- |
| CAPA 4101/A-25 | 23 |
| acetic acid | 2 |
| GPTMS | 12 |
| PM | 34.7 |
| TEOS | 6.2 |
| water | 10 |
| CAPA 4101 | 0 |
| PA-57 | 0.1 |
| choline/DDBS | 12 |

To a plastic beaker, 2 g of acetic acid and 34.7 g of PM and 10 g of water were added. 6.2 g of TEOS and 12 g of GPTMS were slowly added into the mixture with magnetic stirring. After 30 minutes of mixing, 23 g of CAPA 4101/A-25 was slowly added into the mixture. After stirring overnight, 12 g of choline/DDBS and 0.1 g of PA-57 were added.

At ambient temperature, the resulting liquid formed a gel one day after mixing. This indicates that the mixture was not stable for use as a liquid coating composition.

Example 10: Anti-Fog Coating Composition with BL-Si-2

Coating composition was made by adding the ingredients shown in Table 11, measured in parts per total 100 parts.

TABLE 11

| Example 10 | |
| --- | --- |
| N-1034A | 9.8 |
| acetic acid | 1 |
| PM | 22 |
| BL-Si-2 | 13.9 |
| TEOS | 19.3 |
| CAPA 4101 | 10.8 |
| water | 10.6 |

TABLE 11-continued

| Example 10 | |
| --- | --- |
| CIRRASOL G-265 | 7.3 |
| OT-75 | 2.51 |
| 50% IAS-PG in PM | 2.84 |

To 9.8 g of N-1034A taken in a plastic beaker, 1 g acetic acid, 22 g PM and 13.9 g of BL-Si-2 were added. The composition was mixed for 12 hrs. In a separate beaker, 10.6 g of water was added to 19.3 g TEOS and mixed. The mixture was then added to the mixture containing BL-Si-2. The resulting mixture was stirred for 3 hours. Later CAPA 4101 was added and mixed for an hour. To the same, after 1 hour stirring, a prior mixed solution of CIRRASOL G-265 (7.3 g), OT-75 (2.51 g) and 50% SCHERCOQUAT IAS-PG in PM (2.84 g) was added. The entire mixture was then stirred for additional hour and filtered.

A polycarbonate lens substrate is dip-coated in the coating composition at a 25 cm/min draw speed. The coated substrate is pre-cured at 90° C. for 10 minutes and then cured at 125° C. for 2 hours, resulting in a coated substrate. The initial haze was about 0.5%.

The anti-fog properties of this coating were evaluated. This coated substrate passed the initial anti-fog test and the breathe test. This coated substrate also passed the anti-fog test after 3 wipes.

The initial adhesion of the coating was 100%. After placing the coated specimen in boiling water for 1 hour, adhesion of the coating on the polycarbonate sheet was 100%.

While the present application has been illustrated by the description of embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the application, in its broader aspects, is not limited to the specific details and illustrative examples shown and described. Accordingly, departures may be made from such details without departing from the spirit or scope of the applicant's general disclosure herein.

To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B), it is intended to mean "A or B or both." When the applicants intend to indicate "only A or B but not both" then the term "only A or B but not both" will be employed. Thus, use of the term "or" herein is the inclusive, and not the exclusive use. Also, to the extent that the terms "in" or "into" are used in the specification or the claims, it is intended to additionally mean "on" or "onto."

Accordingly, unless otherwise indicated, the numerical properties set forth in the description and claims are approximations that may vary depending on the desired properties sought to be obtained in embodiments of the present disclosure. Notwithstanding that the numerical ranges and parameters setting forth the broad scope of the invention are approximations, the numerical values set forth in the specific examples are reported as precisely as possible.

As used in the description of the invention and the appended claims, the singular forms "a," "an," and "the" are intended to include the plural forms as well, unless the context clearly indicates otherwise.

The coating compositions, and corresponding methods or processes may comprise, consist of, or consist essentially of the essential elements, steps and limitations described herein, as well as any additional or optional ingredients, components, steps, or limitations described herein or otherwise useful in coating composition applications.

What is claimed is:

1. A coating composition which forms a clear, abrasion resistant coating on a substrate, the coating composition comprising:
   (a) hydrolysis products and partial condensates of a blocked isocyanate silane and water, the blocked isocyanate silane represented by the formula:

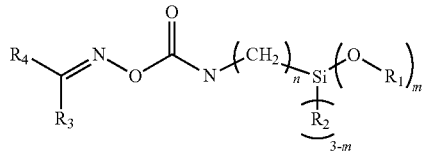

wherein $R_1$ is an alkyl group having from 1 to 10 carbon atoms,
   wherein $R_2$ is an alkyl group having from 1 to 20 carbon atoms,
   wherein $R_3$ is an alkyl group having from 1 to 5 carbon atoms,
   wherein $R_4$ is an alkyl group having from 1 to 5 carbon atoms,
   wherein m is an integer selected from 1, 2, or 3,
   wherein n is an integer selected from 2 to 6; and
   (b) at least one polycaprolactone polyol
   (c) at least one low molecular weight polyol having a molecular weight less than or equal to 300.

2. The coating composition of claim 1, wherein the at least one polycaprolactone polyol has a molecular weight greater than 300.

3. The coating composition of claim 2,
   wherein $R_1$ is a methyl group or an ethyl group,
   wherein $R_3$ is a methyl group,
   wherein $R_4$ is an ethyl group,
   wherein m is 3, and
   wherein n is 3.

4. The coating composition of claim 1,
   wherein $R_1$ is a methyl group or an ethyl group,
   wherein $R_3$ is a methyl group,
   wherein $R_4$ is an ethyl group,
   wherein m is 3, and
   wherein n is 3.

5. The coating composition of claim 1, wherein the coating composition further comprises at least one of an organic blocked isocyanate, a metal oxide sol, silane polymerization curing catalyst, a UV absorber, a hindered amine light stabilizer, an alkoxysilane, a surfactant, a solvent, and combinations thereof.

6. An article comprising a substrate and a coating coated on at least one surface of the substrate, wherein the coating is prepared by thermal curing the coating composition of claim 1 on the substrate at a temperature of at least 100° C. for at least 60 minutes.

7. The article of claim 6, wherein the substrate is a transparent polymer.

8. The article of claim 6, wherein the substrate is a polycarbonate plastic.

9. The article of claim 8, wherein no primer is disposed between the substrate and the coating.

10. The article of claim 9, wherein after the coating has cured on the substrate, and the substrate has a thickness of 3 mm, the article has a formability radius of less than 25 cm without cracking or crazing the coating.

11. The article of claim 6,
wherein $R_1$ is a methyl group or an ethyl group,
wherein $R_3$ is a methyl group,
wherein $R_4$ is an ethyl group,
wherein m is 3, and
wherein n is 3.

12. The article of claim 6, wherein the at least one polycaprolactone polyol has a molecular weight greater than 300.

13. A process for making the coating composition according to claim 1, the process comprising:
mixing the blocked isocyanate silane with water to form a mixture comprising hydrolysis products and partial condensates of the blocked isocyanate silane and water; and
mixing the mixture with the at least one polycaprolactone polyol to form the coating composition.

14. The process of claim 13,
wherein $R_1$ is a methyl group or an ethyl group,
wherein $R_3$ is a methyl group,
wherein $R_4$ is an ethyl group,
wherein m is 3, and
wherein n is 3.

15. The coating composition of claim 1, wherein the at least one low molecular weight polyol having a molecular weight less than or equal to 300 is selected from the group consisting of trimethylolpropane, trimethylolethane, pentaerythritol, dipentaerythritol, hexanediol, butanediol, heptanediol, octanediol, and combinations thereof.

16. The coating composition of claim 1, wherein the coating formed from the coating composition has a haze of less than 0.5%.

17. The coating composition of claim 1, wherein the coating formed from the coating composition has a Taber Abrasion number of 5% or less at 100 cycles with CS-10F wheels and a 500 g auxiliary weight.

18. The coating composition of claim 1, wherein the coating formed from the coating composition has:
a formability radius of less than 25 cm without cracking or crazing the coating when coated on a substrate having a thickness of 3 mm; and
a Taber Abrasion number of 5% or less at 100 cycles with CS-10F wheels and a 500 g auxiliary weight.

* * * * *